United States Patent [19]
Crema

[11] Patent Number: 5,126,881
[45] Date of Patent: Jun. 30, 1992

[54] LENS HOOD FOR A PHOTOGRAPHIC LENS

[75] Inventor: Rolf Crema, Ehringshausen/Greifenthal, Fed. Rep. of Germany

[73] Assignee: Leica Camera GmbH, Wetzlar, Fed. Rep. of Germany

[21] Appl. No.: 660,880

[22] Filed: Feb. 26, 1991

[30] Foreign Application Priority Data

Mar. 1, 1990 [DE] Fed. Rep. of Germany ....... 4006388

[51] Int. Cl.⁵ .................... G03B 11/04; G02B 7/00
[52] U.S. Cl. ............................ 359/611; 354/287
[58] Field of Search ............ 350/580, 581, 587, 252, 350/257, 448, 449, 450; 354/287; 359/611, 612, 511, 819, 827, 738, 739, 740

[56] References Cited

U.S. PATENT DOCUMENTS

| | | | |
|---|---|---|---|
| 1,688,370 | 10/1928 | Wittel | 350/580 X |
| 2,305,665 | 12/1942 | Bolsey | 354/287 |
| 2,845,835 | 8/1958 | Weiss | 350/581 |
| 3,905,675 | 9/1975 | McCracken | 350/448 X |
| 4,989,960 | 2/1991 | Thomas | 350/448 |

FOREIGN PATENT DOCUMENTS

| | | | |
|---|---|---|---|
| 48-75637 | 9/1973 | Japan | 350/580 |
| 52-36023 | 3/1977 | Japan | 350/580 |
| 236399 | 6/1945 | Switzerland . | |
| 446877 | 3/1968 | Switzerland . | |

Primary Examiner—Constantine Hannaher
Assistant Examiner—Edward J. Glick
Attorney, Agent, or Firm—Foley & Lardner

[57] ABSTRACT

A one-piece lens hood possesses a frontal surface having an approximately rectangular opening, is axially displaceable via a guide from a position of rest into a working position, and is indissolubly connected to the lens. In the position of rest, the frontal surface of the lens hood terminates flush with the front edge of an accessory mount so that the threaded portion of the accessory mount is readily accessible for screwing in accessories such as filters. A format stop is additionally provided as an integral part of the lens in order to mask out stray light. This can, for example, be formed from a blackened metal foil which is mounted on a front terminal ring of the lens.

12 Claims, 2 Drawing Sheets

LENS HOOD FOR A PHOTOGRAPHIC LENS

BACKGROUND OF THE INVENTION

The invention relates to a lens hood for a photographic lens, which lens hood is axially displaceable out of a position of use into a position of rest and is connected to the lens in a manner to prevent rotation therebetween.

Swiss Patent No. 236,399 discloses a lens hood of this type. This consists of a stationary part with a bayonet closure and a displaceable part. The stationary part is fixed to the camera independently of the lens and possesses guide pins on which the displaceable part can slide axially from a position of rest into a working position. In both positions, the displaceable part is locked by means of springs against unintentional displacement. In the working position of the lens hood, the stationary part permits lateral access so that the aperture and distance can be set on the lens. This known lens hood is relatively bulky. In order to attach filters, which are screwed into the frontal thread on the accessory mount of the lens, the lens hood has to be removed from the lens.

Swiss Patent No. 446,877 discloses a lens hood for photographic lenses, particularly of short focal length, which comprises a set of mutually interchangeable masks of rectangular cross-section. The individual masks can be connected, by means of a plurality of balls under spring pressure, to a mounting ring which is screwed into the frontal thread of the accessory mount for the lens. Each mask is provided with a gripping element which allows the mask to be twisted for an upright or landscape format. The lens hood is arranged directly in front of the lens in order to mask the circular segments of the lens which are not required to form the image. The addition of filters or other attachments to the lens is not possible when this lens hood is used.

SUMMARY OF THE INVENTION

An object of the present invention is to provide a lens hood of the type mentioned initially which, while of compact dimensions, can at any time be pulled out for use and at the same time is connected to the lens in such a way that it cannot be lost.

Another object of the invention is to provide a lens hood which readily permits the use of accessories such as filters.

Still another object of the invention is to provide a lens hood which reliably masks out stray light.

In accordance with a first aspect of the invention, a lens hood is provided for a photographic lens having an accessory mount. The lens hood, which is axially retractable out of a position of use into a position of rest, comprises a cylindrical barrel, a frontal surface which is integral with the cylindrical barrel and which has an approximately rectangular opening formed therein which is located adjacent the cylindrical barrel. The frontal surface terminates flush with a front edge of the accessory mount when the lens hood is in the position of rest, and a mounting member is integral with the cylindrical barrel and the frontal surface and cooperates with the accessory mount to prevent removal of the lens hood from the lens. A guide is arranged on the accessory mount and prevents the lens hood from rotating. In addition, at least one format stop is formed integral with the lens.

In accordance with another aspect of the invention, the frontal surface may comprise semicircular arcs which, in the position of rest, surround the accessory mount. Recesses may be formed in the frontal surface between the semicircular arcs.

In accordance with still another aspect of the invention, the format stop is located in front of an optical system of said lens, within an optical system of said lens, or behind an optical system of said lens. The format stop preferably comprises one of a plastic film which is bonded onto said lens, a self-supporting blackened metal foil, and a layer which is applied on said lens via one of printing and vapor disposition.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Other details and features of the invention are apparent from the description which follows of an illustrative embodiment, shown diagrammatically in the drawing, all components which are not necessary for an understanding of the invention having been omitted or not referenced for the sake of clarity.

In the drawings.

DETAILED DESCRIPTION OF THE PREFERRED EMBODIMENTS

The lens hood according to the invention is particularly suitable for lenses of short focal length, for example from 21 to 50 mm. Conventional lens hoods for such lenses are voluminous and bulky and require attachment points or locking and unlocking components. The lens hood according to the invention is of short, compact construction and, in its position of rest recessed in the lens, does not impede the screwing in of accessories such as filters into the thread of the accessory mount, or the attachment of a lens cap. When filters are attached to the lens, the lens hood according to the invention can be pulled out unimpeded, i.e., without interference from the filters, and hence brought into the working position.

Because of the short construction of the lens hood, stray light can enter the lens principally through the upper and lower circular arcs of the frontal surface of the lens hood. In order to reliably prevent this from occurring, a format stop is additionally provided as an integral part of the lens which just permits the entry of the marginal rays for the various image heights. It is understood that the geometrical shape of this format stop is to be determined mathematically for the particular lens. The format stop itself can be applied, as an opaque layer, for example to the front lens element by printing or vapor deposition, or in the form of a thin non-reflecting metal foil or plastic film. An additional stop of similar construction can be provided in the rear region of the optical system of the lens in order to exclude unwanted light within the lens or in the inner space of the camera.

Figure 1:
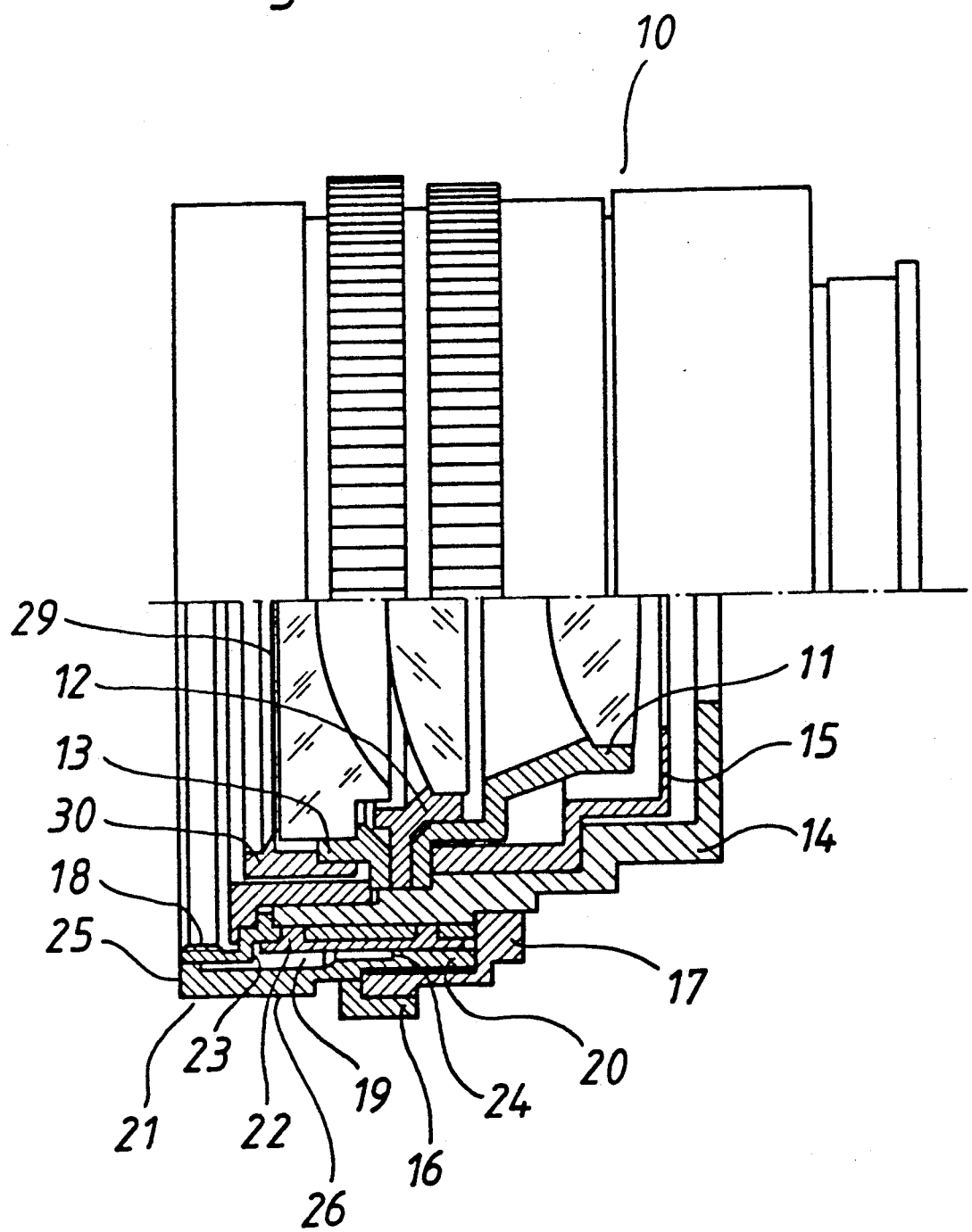
FIG. 1 shows a part of a photographic lens in a cutaway lateral view with a lens hood according to the invention in the pushed-in position of rest.

A photographic lens 10, a detail of which is shown in FIG. 1, possesses a plurality of lens mounts 11, 12, 13, a principal mount 14, and a blade guide ring 15. The latter is connected by a screw, not shown here, to a diaphragm ring 16 via a driving ring 17. The lens is provided with an accessory mount 18 into whose thread optical accessories such as filters, diffusing disks or the like can be screwed. Between the accessory mount 18 and diaphragm ring 16 and the driving ring 17 connected thereto is a slot 19 which accepts a cylindrical barrel 20 of a lens hood 21 when the lens hood adopts its position of rest illustrated in FIG. 1. The one-piece lens hood 21 is secured against twisting by means of a guide 22 arranged on, i.e., is mounted on, the accessory mount 18 and is axially displaceable in the slot 19. Pulling-out, i.e., removal, of the lens hood 21 is prevented by a shoulder 23 located on the accessory mount 18 and a projection 24 located within the lens hood 21. The driving ring 17 forms the stop for the lens hood 21 when the latter is pushed into the position of rest. It is to be noted that in this position the frontal surface 25 of the lens hood 21 terminates virtually flush with the front edge of the accessory mount 18. The thread of the latter is thus freely accessible for the attachment of filters.

Figure 2:
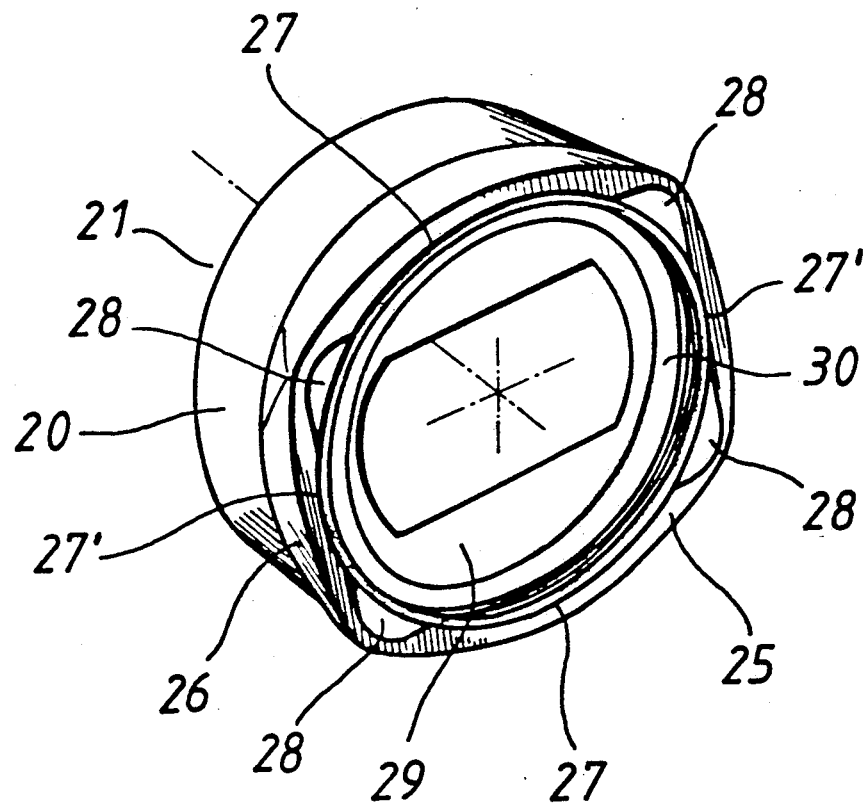
FIG. 2 shows a lens hood according to the invention in perspective view.

The shape of the lens hood 21 is apparent from FIG. 2. A front section 26, having a frontal surface 25, of approximately rectangular opening, is adjoined by the cylindrical barrel 20 and is integral therewith. The frontal surface itself possesses two opposed longer and two opposed shorter circular or semi-circular arcs 27, 27' which pass around or surround the accessory mount in the position of rest of the lens hood and which are in each case adjoined by recesses 28 of substantially radial alignment. These arcs and recesses determine the approximately rectangular opening of the frontal surface 25 of the lens hood 21.

Because of the compact construction of the lens hood 21, which is particularly short in the axial direction, stray light can enter the lens 10, principally through the longer circular arcs 27. In order to prevent this, the lens is provided with a format stop 29. In the present case, this is mounted on a terminal or end ring 30 of the lens 10 and lies directly in front of the front lens element thereof. The format stop 29 may be formed from a self-supporting, blackened metal foil or plastic film and likewise possesses an approximately rectangular opening. In many cases it may be simpler, for reasons of production engineering, to apply the format stop directly to the front lens element in the form of an opaque coating, by printing, or vapor deposition. An additional format stop of similar construction, not shown here, may be provided in the part of the lens close to the camera, for example behind the last lens element, in order to eliminate reflections within the inner space of the camera.

Figure 3:
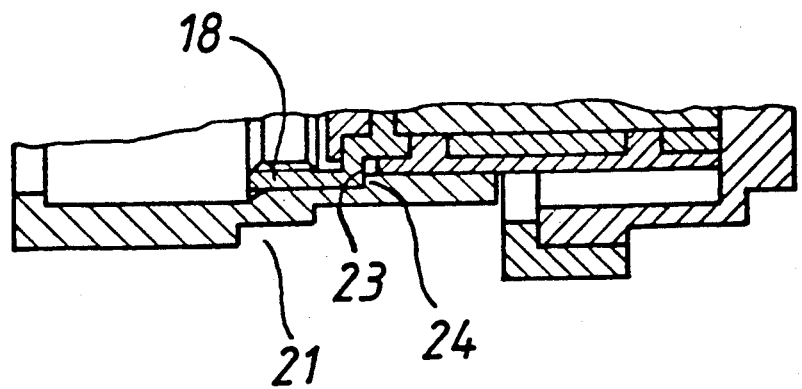
FIG. 3 shows a detail of the lens according to FIG. 1 with the lens hood positioned in the pulled-out position of use.

FIG. 3 shows a detail of the lens 10 according to FIG. 1, for which reason the same reference numerals have been used for the same components. In contrast to FIG. 1, the lens hood 21 here is in the working position, that is to say the pulled-out or extended position. It can be clearly seen that the axial pulling-out is limited by the shoulder 23 on the accessory mount 18 and the projection 24 of the lens hood 21.

What is claimed is:

1. An apparatus comprising:
   (A) A photographic lens, said lens having an accessory mount;
   (B) a lens hood, said lens hood being axially retractable out of a position of use into a position of rest, said lens hood comprising
   a cylindrical barrel,
   a generally rectangular frontal surface which is integral with said cylindrical barrel and which has an approximately rectangular opening formed therein which is located adjacent said cylindrical barrel, said frontal surface terminating flush with a front edge of said accessory mount when said lens hood is in said position of rest, said frontal surface having opposing semi-circular arcs and radially aligned recesses formed in said frontal surface between said semi-circular arcs and
   a mounting member which is integral with said cylindrical barrel and said frontal surface and which cooperates with said accessory mount to prevent removal of said lens hood from said lens;
   (C) a guide which is arranged on said accessory mount and which prevents said lens hood from rotating, said guide being capable of being recessed within said lens; and
   (D) at least one format stop formed integral with said lens.

2. The apparatus as claimed in claim 1, wherein said semi-circular arcs surround said accessory mount in said position of rest.

3. The apparatus as claimed in claim 1, wherein said format stop is located in front of an optical system of said lens.

4. The apparatus as claimed in claim 1, wherein said format stop is located within an optical system of said lens.

5. The apparatus as claimed in claim 1, wherein said format stop is located behind an optical system of said lens.

6. The apparatus as claimed in claim 1, wherein said format stop comprises one of a plastic film which is bonded onto said lens, a self-supporting blackened metal foil, and a layer which is applied on said lens via one of printing and vapor disposition.

7. The apparatus as claimed in claim 1, wherein said mounting member comprises a projection of said lens hood which contacts a shoulder of said accessory mount when said lens hood is in said position of use.

8. An apparatus comprising:
   (A) a photographic lens having an accessory mount;
   (B) a lens hood for said photographic lens, said lens hood being axially retractable out of a position of use into a position of rest, said lens hood comprising
   a cylindrical barrel,
   a frontal surface which is connected to said cylindrical barrel and which has an approximately rectangular opening formed therein which is located adjacent said cylindrical barrel, said frontal surface terminating generally flush with a front edge of said accessory mount when said lens hood is in said position of rest, said frontal surface having opposing semi-circular arcs and radially aligned recesses formed in said frontal surface between said semi-circular arcs and means for preventing removal of said lens hood from said apparatus;

(C) means for preventing rotation of said lens hood with respect to said lens; and (D) at least one format stop located on said lens.

9. The apparatus as claimed in claim 8, wherein said semi-circular arcs in said position of rest, pass around said accessory mount.

10. The apparatus as claimed in claim 8, wherein said format stop comprises one of a plastic film which is bonded onto said lens, a self-supporting blackened metal foil, and a layer which is applied on said lens via one of printing and vapor disposition.

11. The apparatus as claimed in claim 8, wherein said means for preventing removal comprises a projection of said lens hood which contacts a shoulder of said accessory mount when said lens hood is in said position of use.

12. The apparatus as claimed in claim 8, wherein said means for preventing rotation comprises a guide member which is formed integral with said lens hood and which is mounted on said accessory mount.

* * * * *